Patented Aug. 5, 1924.

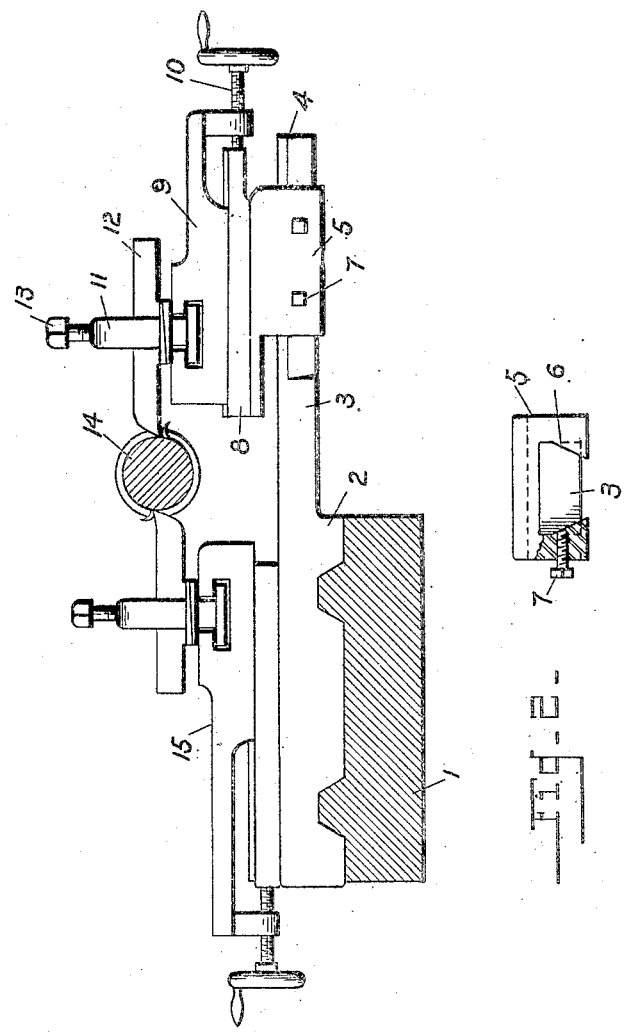

1,503,893

UNITED STATES PATENT OFFICE.

GEORGE GRONNER, OF DAVENPORT, IOWA.

BACK-TOOL HOLDER.

Application filed July 26, 1922. Serial No. 577,757.

(FILED UNDER THE ACT OF MARCH 3, 1883, 22 STAT. L., 625.)

*To all whom it may concern:*

Be it known that I, GEORGE GRONNER, a citizen of the United States, and a resident of Davenport, county of Scott, and State of Iowa, have invented an Improvement in Back-Tool Holders, of which the following is a specification.

The invention described herein may be used by the Government, or any of its officers or employees in prosecution of work for the Government, or by any other person in the United States, without payment to me of any royalty thereon, in accordance with the act of March 3, 1883.

In lathe work it is often desirable, in order that a piece of work may be finished more expeditiously, that a back tool be employed so as to double the depth of cut for each revolution of the work.

The present invention has been devised to provide a holder for such a tool which may be readily adjusted to bring the tool to proper position and which may be easily removed when such tool is not desired on the work.

With these and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a side elevation of a holder constructed in accordance with my invention, shown applied to a lathe, a portion of which is shown, parts being in section;

Fig. 2 is an end elevation.

Referring to the drawing by numerals of reference:

The bed of a lathe is indicated at 1 upon which is mounted a carriage 2 to slide longitudinally thereof, the carriage formed with an extension 3 having a dove tail portion 4.

Mounted on the extension 3 is a tool holder 5 formed with a dove-tail groove 6 to receive the dove-tail portion 4, which holder is adjustable longitudinally of the extension and clamped in adjusted position in any suitable manner, as by set screws 7.

Mounted on the holder is a rest 8 upon which a slide 9 is carried to travel longitudinally thereof, being adjusted to desired positions by the screw 10. The slide is grooved to receive the foot of post 11 in which a tool 12 may be clamped, as by means of screw 13. The tool 12 is provided to operate upon the work 14 which is also operated upon by a tool carried in the usual carrier indicated generally at 15.

I claim:

1. The combination with a carriage formed with a dove tail rear extension, said extension being in the plane of the carriage, of a tool holder having a dove tail groove to receive said extension, a slide adjustable on said holder, a post secured on said slide and means carried by the post for clamping a tool in place thereon.

2. The combination with a carriage formed with a rear extension, said extension being in the plane of the carriage, of a tool holder mounted on said extension and adjustable longitudinally thereof and means for clamping the holder in adjusted position.

GEORGE GRONNER.